(12) United States Patent
Holt et al.

(10) Patent No.: US 9,738,401 B1
(45) Date of Patent: Aug. 22, 2017

(54) VISUAL LANDING AIDS FOR UNMANNED AERIAL SYSTEMS

(71) Applicants: Jordan Holt, Portland, OR (US);
Jeremy Sarao, Portland, OR (US);
Alex Barchet, Hood River, OR (US)

(72) Inventors: Jordan Holt, Portland, OR (US);
Jeremy Sarao, Portland, OR (US);
Alex Barchet, Hood River, OR (US)

( * ) Notice: Subject to any disclaimer, the term of this patent is extended or adjusted under 35 U.S.C. 154(b) by 0 days.

(21) Appl. No.: 15/017,263

(22) Filed: Feb. 5, 2016

(51) Int. Cl.
*B64F 1/18* (2006.01)
*G08G 5/02* (2006.01)
*B64C 19/00* (2006.01)
*G08G 5/00* (2006.01)

(52) U.S. Cl.
CPC ............... *B64F 1/18* (2013.01); *B64C 19/00* (2013.01); *G08G 5/0026* (2013.01); *G08G 5/02* (2013.01); *B64C 2201/141* (2013.01); *B64C 2201/18* (2013.01)

(58) Field of Classification Search
CPC ..... B64F 1/18; B64C 19/00; B64C 2201/141; B64C 2201/18; G08G 5/02; G08G 5/0026
USPC .......................................................... 701/16
See application file for complete search history.

(56) References Cited

U.S. PATENT DOCUMENTS

| 7,705,879 | B2 | 4/2010 | Kerr et al. | |
|---|---|---|---|---|
| 2009/0009596 | A1 | 1/2009 | Kerr et al. | |
| 2012/0078451 | A1* | 3/2012 | Ohtomo | B64C 39/024 701/15 |
| 2016/0122038 | A1* | 5/2016 | Fleischman | B64F 1/20 701/2 |

* cited by examiner

*Primary Examiner* — Anne M Antonucci
(74) *Attorney, Agent, or Firm* — Mohr Intellectual Property Law Solutions, PC

(57) ABSTRACT

Visual landing aids including a series of contrasting circles and polygons for unmanned aerial vehicles that are capable of being accurately detected over a wide range of angles and distances by an unmanned aerial vehicle equipped with a camera and shape detection capabilities. The visual landing said may be implemented using contrasting colors for the pattern which reflect visible and/or UV or infrared light, or by light emitting elements. In some examples, the landing aids includes a secondary smaller version of the landing aid shape pattern that is embedded within the larger pattern, to enable greater detection range while facilitating close-in precision guidance. In still further examples, light emitting elements may be pulsed at a rate that is synchronized with the camera shutter on the unmanned aerial vehicle to further enhance accurate detection.

18 Claims, 5 Drawing Sheets

VISUAL LANDING AIDS FOR UNMANNED AERIAL SYSTEMS

BACKGROUND

The present disclosure relates generally to landing systems for unmanned aerial vehicles. In particular, visual landing aids for camera-equipped unmanned aerial vehicles are described.

Known systems and methods for landing for unmanned aerial vehicles are not entirely satisfactory for the range of applications in which they are employed. For example, existing systems and methods typically employ either GPS positioning, some type of laser or radar range finding, human intervention or manual control, or some combination of the foregoing. GPS positioning is subject to potential loss of satellite signal, and to be fully effective requires the loading of a terrain database into the unmanned aerial vehicle's flight controller. Without the terrain database, the unmanned aerial vehicle will not know its height above ground in order to make a correct landing and, in any event, can suffer limited precision. Laser or radar range finding requires additional equipment on the unmanned aerial vehicle which diminishes payload, and while providing accurate vertical guidance, does not by itself provide for homing into a particular designated landing target. Human intervention and manual control, while being accurate, is subject to pilot error and precludes a fully autonomous mission profile.

Finally, conventional landing targets may be subject to false positives and/or may require special hardware for detection. Landing aids that use radio beacons may be subject to jamming or glitches.

Thus, there exists a need for landing aids that improve upon and advance the design of known systems and methods for landing unmanned aerial vehicles. Examples of new and useful landing aids relevant to the needs existing in the field are discussed below.

Disclosure addressing one or more of the identified existing needs is provided in the detailed description below. Examples of references relevant to visual landing aids include U.S. Patent References: U.S. Pat. No. 7,705,879 and patent application publication US20090009596. The complete disclosures of the above patents and patent applications are herein incorporated by reference for all purposes.

SUMMARY

The present disclosure is directed to a visual landing aid comprised of a series of circles and polygons for unmanned aerial vehicles that is capable of being accurately detected over a wide range of angles and distances by an unmanned aerial vehicle equipped with a camera and shape detection capabilities. The visual landing aid may be implemented using contrasting colors for the pattern which reflect visible and/or UV or infrared light, or by light emitting elements. In some examples, the landing aid includes a secondary smaller version of the landing aid shape pattern that is embedded within the larger pattern, to enable greater detection range while facilitating close-in precision guidance. In still further examples, the light emitting elements may be pulsed at a rate that is synchronized with the camera shutter on the unmanned aerial vehicle to further enhance accurate detection.

DETAILED DESCRIPTION

Figure 1A:
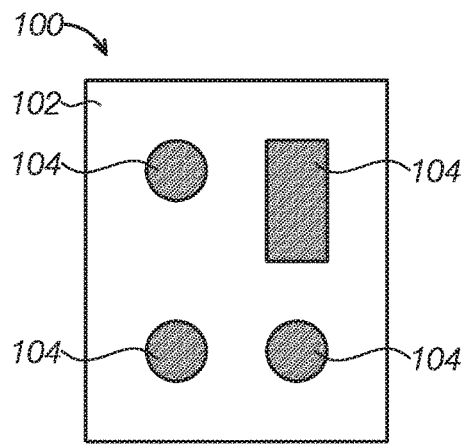
FIGS. 1A through 1F are diagrams of various arrangements of visual landing aids.
Figure 1B:
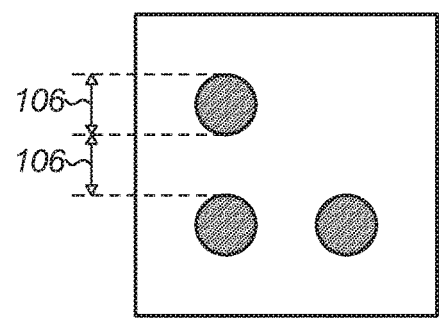

The disclosed visual landing aids will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity each and every contemplated variation is not individually described in the following detailed description.

Throughout the following detailed description, examples of various visual landing aids are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

With reference to FIGS. 1A-4, a first example of a visual landing aid, landing aid 100, will now be described. Landing aid 100 functions to provide a fixed ground reference useful by an unmanned aerial vehicle that is in flight to effect a precision landing. Landing aid 100 is designed to be detectable by a wide range of camera resolutions, at a wide range of distances, and in any orientation. Moreover, landing aid 100 is intended to allow an unmanned aerial vehicle to determine its orientation with respect to landing aid 100. The reader will appreciate from the figures and description below that landing aid 100 addresses shortcomings of conventional visual landing aids.

For example, by providing a predetermined and fixed landing point on the ground, landing aid 100 does not require the unmanned aerial vehicle to rely upon a GPS database or onboard range finding equipment. Landing aid 100 can allow an unmanned aerial vehicle to guide itself into a landing point using only an onboard camera, which is typically carried by unmanned aerial vehicles, and a processing module capable of performing shape detection and interfacing with the unmanned aerial vehicle's flight controller. Further, landing aid 100 allows the unmanned aerial vehicle to land itself precisely upon or near landing aid 100 completely autonomously, without the need for human intervention. Landing aid 100, when implemented as a reflective target, is not itself subject to equipment failure, and the shapes and colors of landing aid 100 can be selected so as to minimize false positives.

Landing aid 100 for unmanned aerial vehicles (UAVs) includes a background 102, upon which are located one or more shapes 104 in a color that contrasts with the background. Shapes 104 are arranged in a mathematically verifiable pattern that is useful for determining the orientation and distance of an unmanned aerial vehicle (UAV) 300 to relative to the landing aid 100. The shapes 104 are capable of being detected by a camera and then recognized by an image processing system on board UAV 300. In other examples, landing aid 100 may include additional or alternative features, such as a pulsed light source and possibly a beacon for synchronizing with a camera located onboard UAV 300.

Figure 1C:
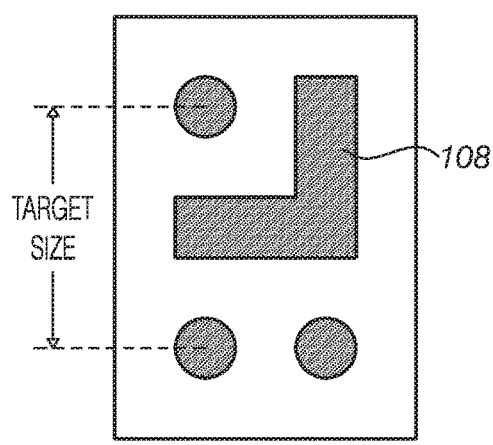
Figure 1D:
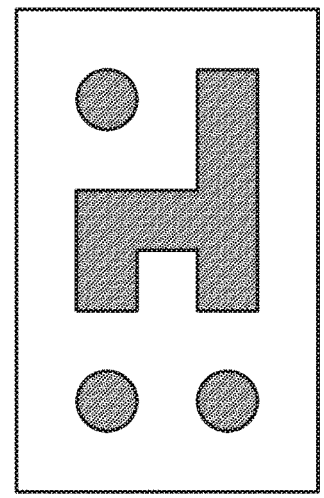
Figure 1E:
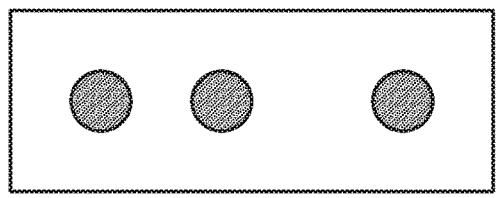
Figure 1F:
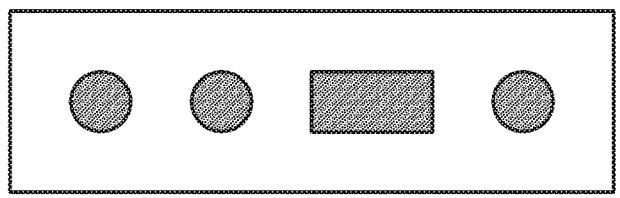

As can be seen in FIGS. 1A through 1F, shapes 104 comprise at a minimum a plurality of circles, and can optionally include one or more polygons 108, typically implemented as a rectangle, as seen in FIGS. 1A and 1F, or as one or more conjoined rectangles, as can be seen in FIGS. 1C and 1D. Each shape 104 has a minimum height 106, and is accordingly separated from all other shapes 104 by at least minimum height 106, or preferably some integer multiple of minimum height 106. It is seen in the figures that the various shapes are arranged in an approximate grid-like fashion, and in a pattern that is unique from all orientations, viz. there is no mirroring of the pattern. This arrangement allows for ready detection by UAV 300 and further allows UAV 300 to determine its orientation relative to landing aid 100. Orientation determination is useful if a landing approach is best effected from only certain directions, such as where high terrain or obstacles surround most of a landing site, or where landing systems such as hooks or nets are employed that require UAV 300 to approach from a particular direction to be snagged by the landing system.

The selection of circles and polygons on landing aid 100 is intended to reduce false positives against most terrain. However, other types of shapes that are detectable by machine shape detection algorithms can be used for landing aid 100 without departing from the disclosed invention. Moreover, other types of machine readable patterns, such as bar codes, 2D matrices such as QR codes, and other types of tags may be integrated into landing aid 100 in order to reduce false positives, and to accurately and positively identify a desired landing target.

One conventional implementation of landing aid 100 has background 102 rendered in white, with shapes 104 rendered in black, to provide maximum contrast. Alternatively, where landing aid 100 is located within a predominantly light background, background 102 may be rendered in black, with shapes 104 rendered in white. Still further, background 102 and shapes 104 may be rendered in any combination of colors and/or shades that sufficiently contrast against each other as well as the surrounding background. For example, where a landing aid 100 is placed within a predominantly green background, background 102 may be colored in a contrasting color such as red or blue, with shapes 104 rendered in a color that contrasts against background 102. Thus, landing aid 100 is colored in such a fashion to be clearly detectable against the surrounding environment. These various colors can be rendered using paint, ink, or any other material that is reflective of the desired colors in the visible light spectrum.

In addition to materials capable of reflecting and/or absorbing visible light, the shape patterns on landing aid 100 can be rendered using any material or method capable of rendering the shape patterns in a sufficiently contrasting fashion that can be detected by a camera system on UAV 300. For example, landing aid 100 could be rendered using materials that are reflective of non-visible light, such as infrared or ultraviolet. Using infrared reflective material for shapes 104 would allow UAV 300, when equipped with a suitable infrared-sensitive camera, to locate landing aid 100 in low-visibility or low-visible light conditions. Furthermore, landing aid 100 could be rendered using light emitting materials, such as lamps or LEDs, thereby allowing detection by and guidance of UAV 300 in night or total darkness conditions, where a landing aid 100 implemented using purely reflective materials would be undetectable. Where landing aid 100 is implemented using light emission, the light emission may be continuous or optionally pulsed, which will be addressed in greater detail herein.

FIGS. 1A through 1F demonstrate multiple possible patterns of shapes, although it will be appreciated by a person skilled in the relevant art that possible patterns are not limited to the depicted examples. The use of varying patterns allows landing aid 100 to be tailored so as to clearly contrast with the surrounding environment. Furthermore, the flight controller of unmanned aerial vehicle 300 can be programmed to recognize and track in on a single pattern, thereby allowing several landing targets, each specific to a particular UAV 300 to be placed proximate to each other.

Landing aid 100 can be scaled to any size, with larger sizes being detectable at greater ranges, but having a practical limit of needing to be within the field of view of whatever camera is installed upon UAV 300. If landing aid 100 is too large, then UAV 300 will be unable to track in once landing aid 100 exceeds the field of view of UAV 300's camera as UAV 300 draws near to landing aid 100. The limit of potential detectability of landing aid 100 will depend upon the resolution of the camera installed upon UAV 300. In keeping with Nyquist's Theorem, landing aid 100 is only detectable when the size of shapes 104 cover approximately four pixels of the imaging sensor of UAV 300's camera; if shapes 104 do not cover at least four pixels, they will become indistinct due to aliasing. Thus, the higher the resolution of UAV 300's camera, the smaller the associated pixels, and the greater the range of potential detection of landing aid 100.

Figure 2A:
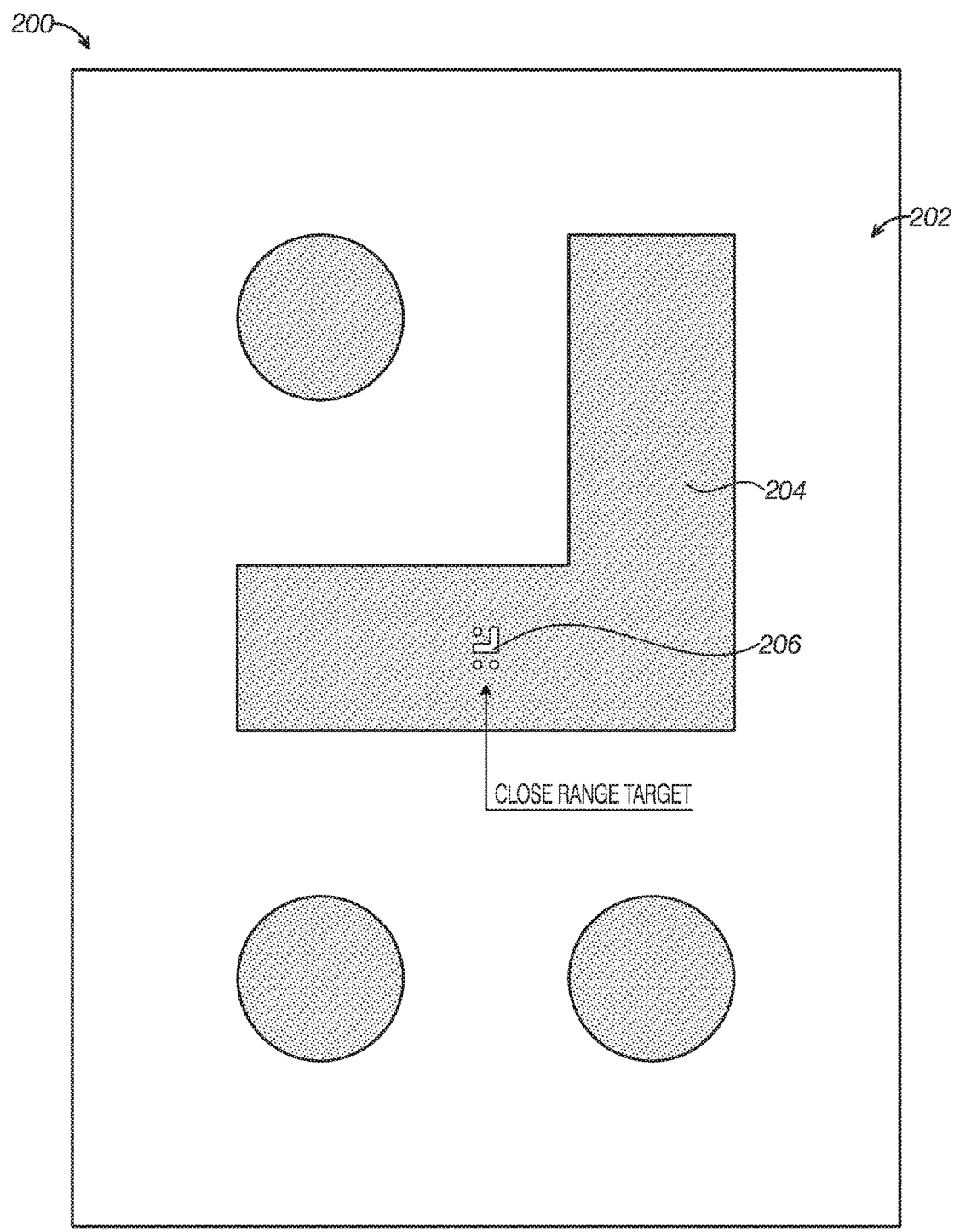
FIG. 2A is a diagram of a second arrangement for a visual landing aid, showing a secondary precision target pattern embedded in the primary pattern that is presented in reverse contrast.
Figure 2B:
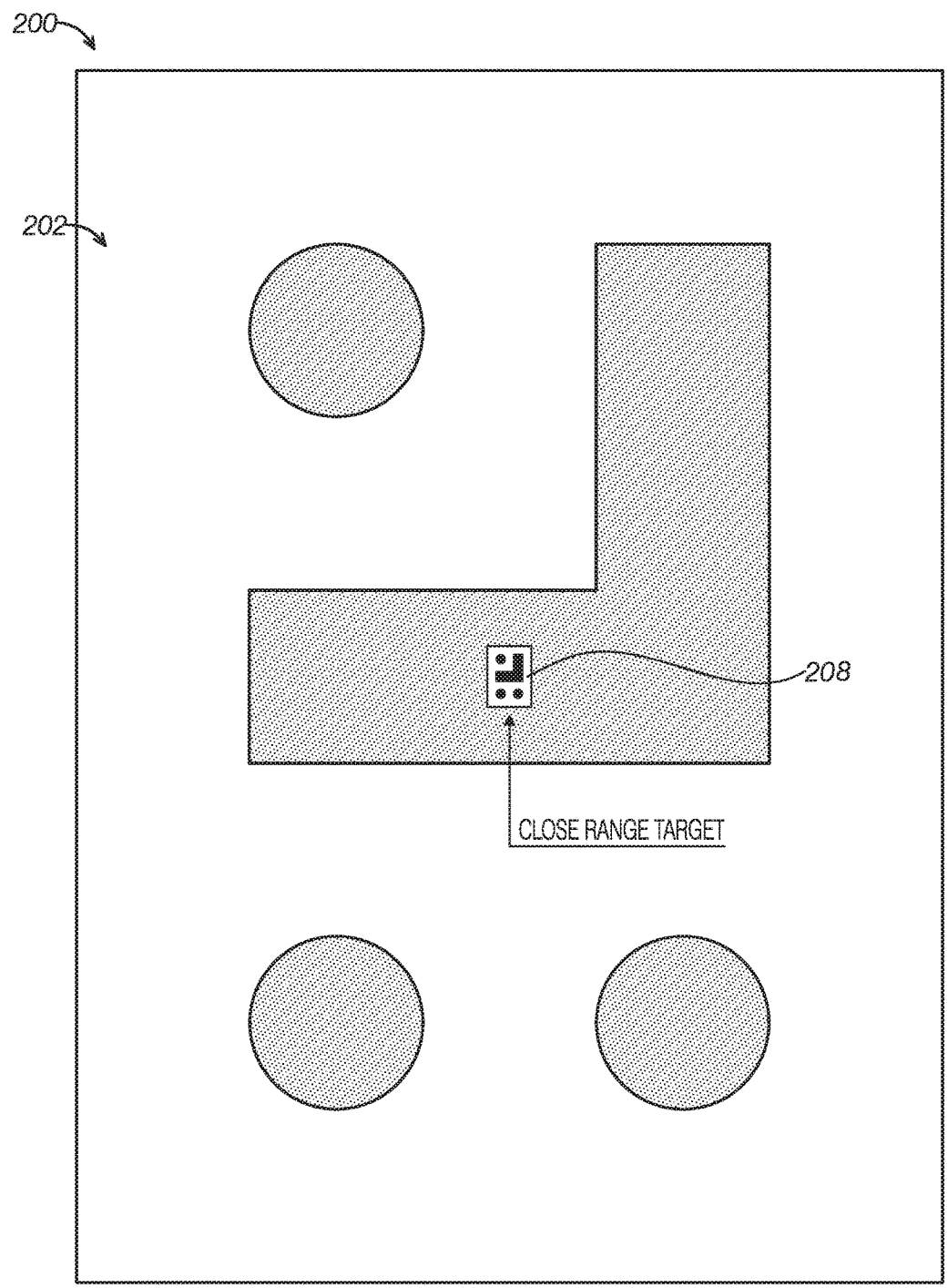
FIG. 2B is a diagram of the second arrangement for a visual landing aid depicted in FIG. 2A, showing the secondary precision target pattern embedded in the primary pattern presented in the same contrast as the primary pattern.

Turning attention to FIGS. 2A and 2B, a second variation of landing aid 100 will now be described. Landing aid 200 includes many similar or identical features to landing aid 100. Thus, for the sake of brevity, each feature of landing aid 200 will not be redundantly explained. Rather, key distinctions between landing aid 200 and landing aid 100 will be described in detail and the reader should reference the discussion above for features substantially similar between the two landing aids.

As can be seen in FIG. 2A, landing aid 200 includes a background 202 with a series of shapes 204 set upon background 202 in contrasting colors. The configuration and contrasting colors and/or shades of shapes 204 are identical to landing aid 100. However, landing aid 200 also includes a close range target 206 which is embedded within one of the shapes 204, which is preferably rendered in the same color or shade of background 202, thus causing close range target 206 to contrast with surrounding shape 204. The pattern of close range target 206 is preferably identical to the pattern of shapes 204, but scaled down sufficiently with respect to the size of landing aid 200 so as to become effective once UAV 300 approaches close enough so that landing aid 200 exceeds the field of view of a camera attached to UAV 300. Thus, landing aid 200 can be made larger than would be possible with landing aid 100, by essentially nesting subsequently smaller landing aids so that UAV 300 always has a target within the field of view of its camera until landing.

FIG. 2B, which depicts a landing aid 200, shows a variation of landing aid 200 depicted in FIG. 2A. Close range target 208, however, is rendered as a smaller version of landing aid 200, with a small background and shapes that match the colors and/or shading of background 202 and shapes 204.

It should be appreciated that, depending upon the size of landing aid 200, close range targets 206 and 208 can further have additional, smaller close range targets embedded within them, for even greater precision. Furthermore, while close range targets 206 and 208 are depicted as having an identical pattern to landing aid 200, this is not necessary; close range targets 206 and 208 can be different patterns, which can further signal a close range to UAV 300, or possibly trigger additional landing preparations in UAV 300, such as extending landing gear. Still further, close range targets 206 and 208 do not need to be centered within the middle of landing aid 200. The close range target can be located anywhere upon landing aid 200 so long as it sufficiently contrasts against background 202 or shapes 204, depending upon its location. It should be appreciated that close range targets 206 and 208 need not match the colors of background 202 and shapes 204, but can be in additional different contrasting colors, as light emissive elements, or can be implemented to reflect or emit non-visible spectrum light such as UV or infrared.

Figure 3:
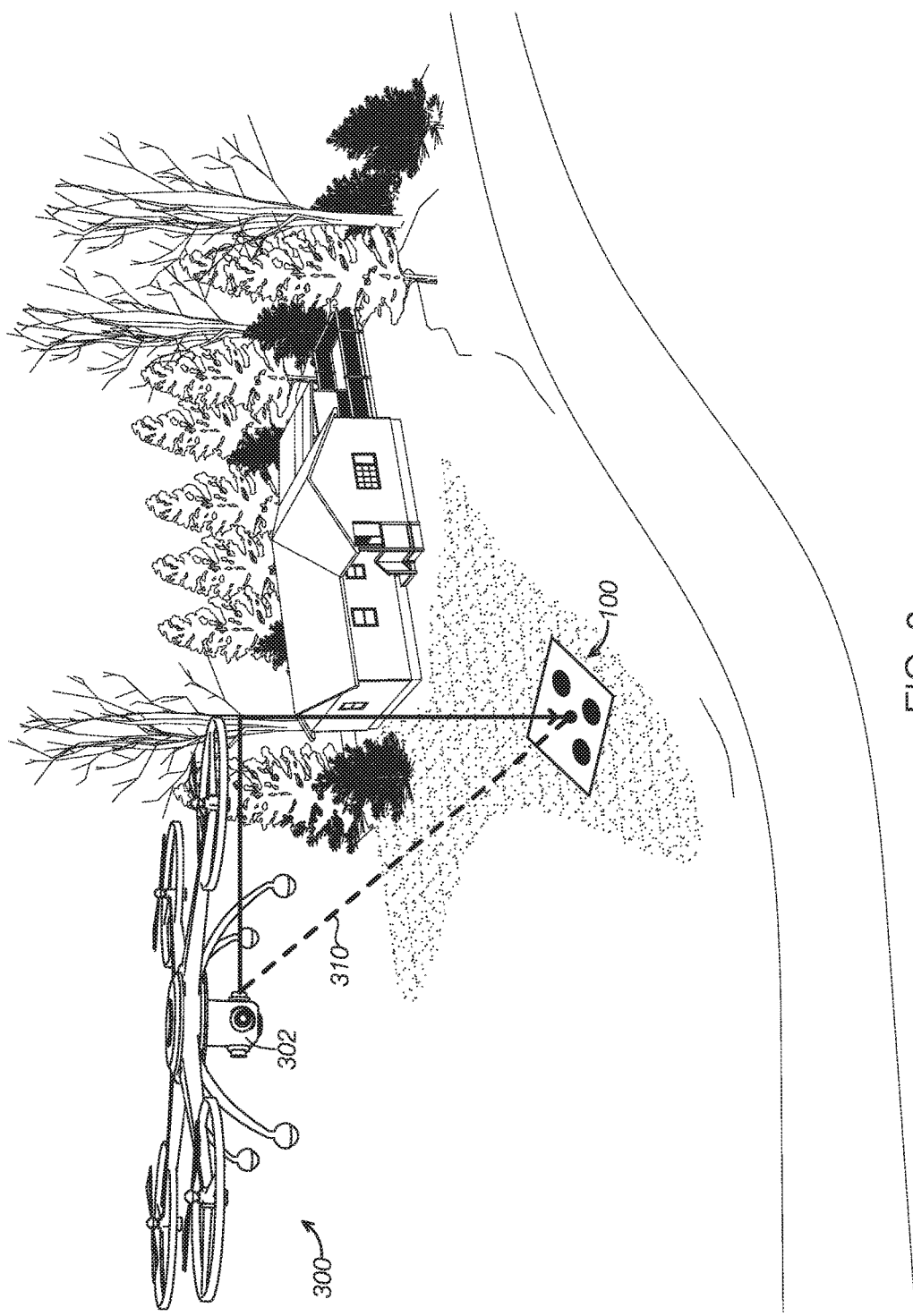
FIG. 3 is a perspective view of an unmanned aerial vehicle (UAV) in a flight setting where the visual landing aid can be used to guide the UAV in for a landing.

FIG. 3 depicts landing aid 100 in use with UAV 300. UAV 300 is shown with a camera 302, which is capable of detecting landing aid 100, which in turn is rendered in a fashion as described above that is within the visual detection range of camera 302. Camera 302 is able to locate landing aid 100 along angle of view 310. By centering landing aid 100 within the field of view of camera 302. UAV 300 can make a precise approach to landing by following angle of view 310, where landing aid 100 simply continually increases in size as UAV 300 approaches. Furthermore, where camera 302 is mounted on a gimbal, the angle of camera 302 relative to landing aid 100 can be determined. Where UAV 300 is equipped with GPS location, its altitude above ground can be known. As depicted in FIG. 3, a right triangle can be visualized between landing aid 100 and UAV 300. By combining the angle of camera 302 with GPS altitude, the distance to landing aid 100 can be approximated using well-known trigonometric techniques, such as the law of sines.

UAV 300 is any unmanned aerial vehicle that is equipped with electronics and guidance systems typical for its size, so long as UAV 300 is equipped with camera 302. The size can range from small UAVs such as the DJI Phantom series of quadcopters (www.dji.com) to large scale UAV systems in use by military and government organizations, such as the General Atomics MQ-9 Reaper.

Figure 4:
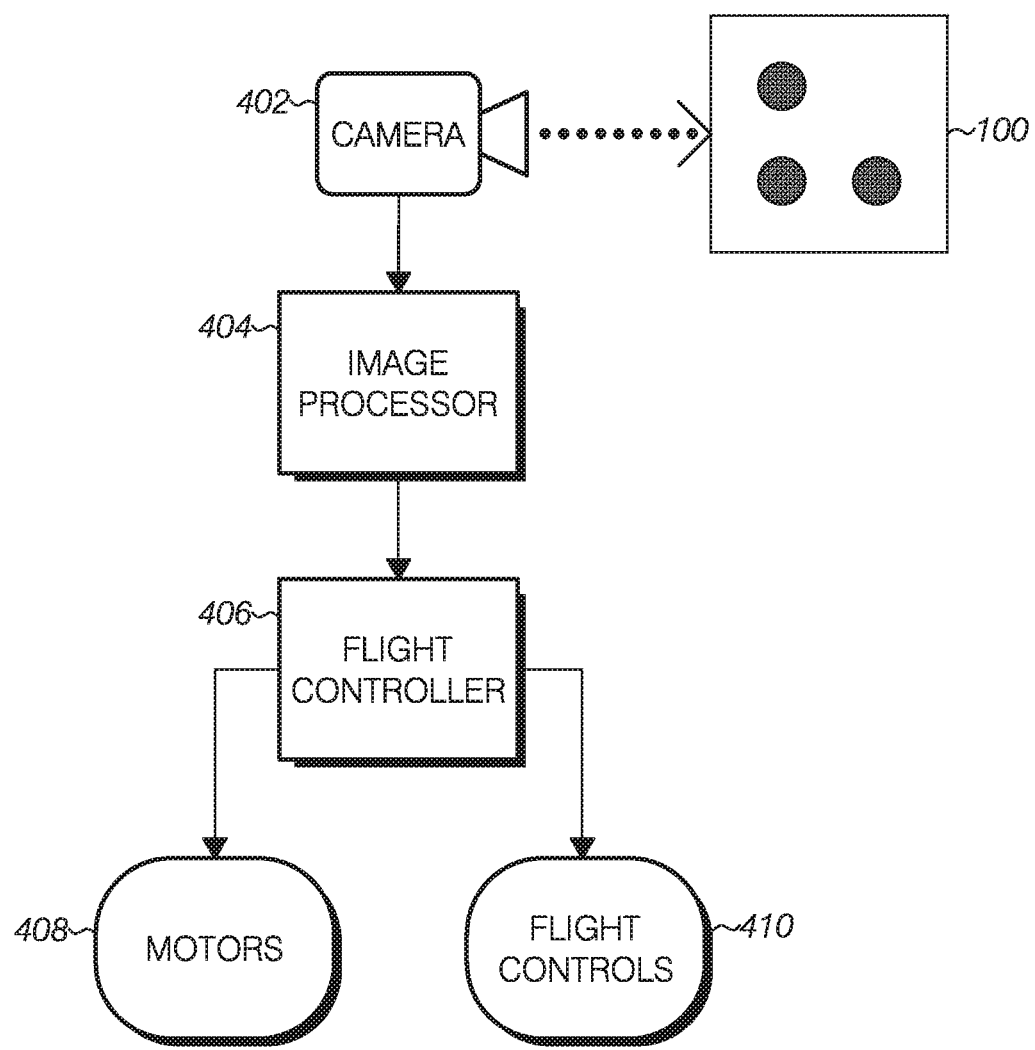
FIG. 4 is a block diagram of the components on board a UAV for image processing and detection of a visual landing aid to be used to guide the UAV relative to the position of the visual landing aid.

Turning to FIG. 4, the components of an image detection system that can be implemented on UAV 300 for detecting landing aid 100 are shown. The image detection system is comprised of a camera 402, which is in data communication with an image processor 404. Image processor 404 in turn feeds information about the location of landing aid 100 into flight controller 406, which in turn controls the motors 408 and/or flight controls 410 of UAV 300 so as to guide UAV 300 relative to landing aid 100. Camera 402 is any standard camera that is suitable for being attached to UAV 300, and with UAV 300's payload parameters. Camera 402 and landing aid 100 must be compatible insofar as camera 402 must be capable of imaging landing aid 100. Camera 402 accordingly may be sensitive to infrared, ultraviolet, visible light, or a combination of the foregoing, as appropriate to how the shapes are rendered on landing aid 100. Camera 402 may use CCD, CMOS, or any other suitable imaging technology now known or later developed.

Image processor 404 receives a video stream from camera 402, and performs an initial shape detection upon the video stream, specifically to identify circles and polygons. Shape detection may be carried out using any suitable algorithm now known or later developed in the relevant art that is capable of conveying the geometry and location in the field of view of each detected shape, such as convolution, correlation, edge detection, Hough transform, or a combination of techniques. The selection of technique or techniques can be tailored to the processing power of image processor 404 and the relative needs for speed and accuracy. Once shape detection is carried out, a second pattern matching algorithm is carried out to detected the presence of landing aid 100 within camera 402's field of view, to ensure that identification is accurate, and not a false positive.

A further step may be carried out for certain implementations of landing aid 100 that are illuminated for night or low-light direction. Landing aid 100 can be implemented with a pulsed light source, that repeatedly flashes. By synchronizing the flashing of landing aid 100 with the frame rate of camera 402 at a ratio of two to one, landing aid 100 can be made to appear only every other frame of the video stream from camera 402. Detection of landing aid 100 can then be accomplished by simple comparison between frames, with the difference between frames revealing the position of landing aid 100. Landing aid 100 and camera 402 can be synchronized by reference to an external time base, such as a GPS receiver installed on both UAV 300 and landing aid 100 that can provide a common synchronized time base. Other synchronizing methods may also be possible, including a radio beacon either on UAV 300 or landing aid 100 that signals shutter actuation or light pulsing, respectively. These later methods are useful where camera 402 may have a variable frame rate. It will be understood by a person skilled in the relevant art that using GPS as a common time base for synchronization alone, apart from a real-time exchange of information between UAV 300 and landing aid 100 will require a prior determined common frame and pulse rate.

For the example landing aid pattern depicted in FIGS. 1C, 2A and 2B, the L-shaped arrangement of the circles is detected. Each of the three circles corresponds to a point i, j and k. Point i is at the corner of the L-shape, point j is located along the long axis of the L-shape, and point k is located along the short axis. It is observed that the example landing aid pattern is arranged with a 1:2 ratio, where point k is located two diameters of a circle from point i, and point j is located four diameters from point i. Thus, the relationship of $Dx(ij)*2=Dx(ik)*4$, or $Dx(ij)*2=neg(Dx(ik)*4)$ is used on any detected circles of approximately equal diameter to locate landing aid 100 within the field of view of camera 402. Observe that the negated version of the relationship equation is useful for detecting landing aid 100 when the L-shape is presented in reverse.

It will be appreciated by a person skilled in the relevant art that the foregoing algorithm is specific to the examples in the listed figures. The parameters of the foregoing algorithm will be varied to accommodate the differing spacing between circles in other examples, such as seen in FIGS. 1A, 1B, 1D, 1E and 1F, or any other patterns devised for landing aid 100. Varying the detection parameters of the foregoing algorithm allows for discrimination and isolation of one particular pattern when multiple targets are within camera 402's field of view.

Once image processor 404 has detected and determined the location of landing aid 100, it can pass directional information to flight controller 406 for directing UAV 300 relative to landing aid 100. Such information can be used to direct UAV 300 to perform a predetermined flight path, such as reorienting UAV 300 to a certain position relative to landing aid 100, and automatically bringing UAV 300 in to land. Flight controller 406 can be a commercial off-the-shelf flight controller, such as the open source ArduPilotMega or DJI's Naza line of flight controllers, or can be custom developed to interact with image processor 404 in a more complex fashion. The algorithms that flight controller 406 uses to direct UAV 300 are well known in the art, and any such algorithms now known or later developed may be utilized, depending upon the mission parameters for UAV 300.

It will be recognized by a person skilled in the relevant art that the disclosed visual landing aids can be utilized for purposes other than just landing. By providing a fixed visual point of reference on the terrain, a UAV 300 can navigate with respect to the fixed point of reference so long as the landing aid is visible within UAV 300's camera. In one possible alternative use, a series of landing aids could be supplied at various points along a predetermined course, which could then be used by UAV 300 to navigate the predetermined course. By varying the patterns of the various landing aids, UAV 300 could be programmed to perform different actions as it approaches each consecutive different landing aid. Moreover, the disclosed visual landing aids have applicability beyond UAVs, and can be deployed any place a visual target that is readily identifiable and trackable by machine vision is desired. Such applications could include space and maritime docking procedures, in-air refueling, and assistance to landing manned aircraft, to name a few possible alternative applications.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A visual landing aid system for unmanned aerial vehicles, comprising:
   a background; and
   a first pattern of a plurality of shapes disposed upon the background: and
   a second pattern of a plurality of shapes smaller than the first pattern,
   wherein each of the plurality of shapes is arranged in a mathematically verifiable pattern that can be used by an unmanned aerial vehicle to determine its orientation and distance relative to the visual landing aid, the plurality of shapes comprising a plurality of circles each of the same diameter and spaced apart from each other at least the diameter of one of the plurality of circles,
   each of the plurality of shapes are capable of being recognized by a camera and image processing system on board the unmanned aerial vehicle, and
   detection of the second pattern by the unmanned aerial vehicle triggers the unmanned aerial vehicle to perform an action other than, or in addition to, landing the unmanned aerial vehicle.

2. The visual landing aid of claim 1, wherein the one or more shapes further comprise one or more polygons, each of the one or more polygons having an area equal to or greater than that of the circle.

3. The visual landing aid of claim 1, wherein the second pattern is a mirror image of the first pattern.

4. The visual landing aid of claim 1, wherein the second pattern is a reversed-contrast image of the first pattern.

5. The visual landing aid of claim 1, wherein the one or more shapes are arranged in a pattern on the background that is distinguishable from the environment surrounding the visual landing aid.

6. The visual landing aid of claim 1, wherein the one or more shapes are painted upon the background in a color that is contrasting in the visual spectrum.

7. The visual landing aid of claim 1, wherein the one or more shapes are comprised of one or more illuminated elements.

8. The visual landing aid of claim 1, wherein the one or more shapes are visible to an infrared camera.

9. A system for assisting automatic landing of an unmanned aerial vehicle, comprising:
   a visual target comprised of:
   a first plurality of shapes in a contrasting color from a background, the plurality of shapes comprising a plurality of circles each of the same diameter and spaced from each other at least the diameter of one of the plurality of circles;
   a second plurality of shapes, smaller than the first plurality of shapes, in a contrasting color from the first plurality shapes, the second plurality of shapes comprising a plurality of circles each of the same diameter and spaced from each other at least the diameter of one of the plurality of circles:
   at least one camera capable of detecting the visual target;
   a processor unit in data communication with the camera for detecting the visual target; and
   a flight controller system in data communication with the processor unit for guiding the unmanned aerial vehicle relative to the visual target upon detection of the first plurality of shapes, wherein:
   the processor unit is configured to perform an action other than, or in addition to, guiding the unmanned aerial vehicle relative to the visual target upon detection of the second plurality of shapes.

10. The system of claim 9, wherein the camera, processor unit, and flight controller system are all located onboard the unmanned aerial vehicle.

11. The system of claim 9, wherein the visual target further comprises one or more polygons.

12. The system of claim 11, wherein the first and second plurality of shapes of the visual target reflect visible light.

13. The system of claim 11, wherein the first and second plurality of shapes of the visual target reflect infrared light.

14. The system of claim 11, wherein the first and second plurality of shapes of the visual target emit light.

15. The system of claim 14, wherein the first and second plurality of shapes of the visual target emit light in a pulsed fashion that is synchronized to the frame rate of the camera.

16. An unmanned aerial vehicle landing system, comprising: an unmanned aerial vehicle, further comprising:
   a camera,
   an image processing unit in data communication with the camera, and
   a flight controller in data communication with the image processing unit; and a visual landing aid, further comprising:
   a background of a first color,
   a first plurality of shapes of a second color that visually contrasts with the first color, the first plurality of shapes arranged in a first mathematically verifiable pattern, and
   a second plurality of shapes, smaller than the first plurality of shapes, that visually contrasts with the first plurality of shapes and is arranged in a second mathematically verifiable pattern:
   wherein:
   the image processing unit is capable of detecting the first and second mathematically verifiable patterns of the visual landing aid when the visual landing aid is within the camera's view,
   the first and second plurality of shapes each further comprise a plurality of circles of identical size, spaced apart from each other at least the diameter of one of the plurality of circles, and
   the flight controller is capable of directing the unmanned aerial vehicle relative to the visual landing aid on the basis of the detected first mathematically verifiable pattern, and of
   triggering an action other than, or in addition to, directing the unmanned aerial vehicle relative to the visual landing aid upon detection of the second mathematically verifiable pattern by the image processing unit.

17. The landing system of claim 16, wherein the first and second plurality of shapes further comprise at least one polygon.

18. The landing system of claim 17, wherein the second mathematically verifiable pattern provides a precise landing point for the unmanned aerial vehicle.

* * * * *